United States Patent [19]

Nicklas et al.

[11] Patent Number: 5,531,216
[45] Date of Patent: Jul. 2, 1996

[54] SOLAR ENERGY CONCENTRATING SYSTEM HAVING AN AUTOMATIC SAFETY MEANS

[76] Inventors: Michael H. Nicklas, 1237 Gatehouse Dr., Cary, N.C. 27511; Louis J. Gerics, 804 Sasser St., Raleigh, N.C. 27604

[21] Appl. No.: 379,845

[22] Filed: Jan. 26, 1995

[51] Int. Cl.[6] .................................................. F24J 2/40
[52] U.S. Cl. ...................... 126/599; 126/571; 126/573; 126/593; 126/684; 126/692; 126/594
[58] Field of Search ................................ 126/684, 573, 126/651, 657, 692–695, 600–608, 570, 572, 571, 576, 585, 589, 599, 593, 594

[56] References Cited

U.S. PATENT DOCUMENTS

| | | |
|---|---|---|
| 2,625,930 | 1/1953 | Harris .................................. 126/621 X |
| 3,868,823 | 3/1975 | Russell, Jr. et al. ................. 126/600 X |
| 4,149,523 | 4/1979 | Boy-Marcotte et al. ............... 126/589 |
| 4,291,679 | 9/1981 | Kersavage ............................... 126/621 |
| 4,309,984 | 1/1982 | Darbeck ................................... 126/599 |
| 4,579,106 | 4/1986 | Townsend et al. ................. 126/621 X |
| 4,587,951 | 5/1986 | Townsend et al. ................. 126/621 X |
| 4,602,613 | 7/1986 | Barr ....................................... 126/600 |

*Primary Examiner*—Larry Jones
*Attorney, Agent, or Firm*—Brian D. Voyce

[57] ABSTRACT

The present invention relates to an improved moveable-collector, solar energy concentrating system incorporating an automatic safety means. In the present invention, if there is a failure in a solar-heated fluid transfer system, a failure in the positioning means for a reflected solar energy collector, or a failure in power to the system, then the collector is automatically moved out of an optimal position in a predetermined focal collection zone.

16 Claims, 4 Drawing Sheets

SOLAR ENERGY CONCENTRATING SYSTEM HAVING AN AUTOMATIC SAFETY MEANS

TECHNICAL FIELD

The present invention relates to an improved moveable-collector, solar energy concentrating system incorporating an automatic safety means. In the present invention, if there is a failure in a solar-heated fluid transfer system, a failure in the positioning means for a reflected solar energy collector, or a failure in power to the system, then the collector is automatically moved out of a predetermined focal collection zone.

BACKGROUND ART

In the past, solar energy concentrating systems used a variety of approaches for handling a failure in a fluid transfer system which circulates a fluid heated by reflected solar energy. For example, a commercially available system in the 1980's had a stationary reflected solar energy collector with an interior conduit for the solar-heated fluid. A moveable, solar energy concentrating reflector was disposed below the stationary solar energy collector so as to place the solar energy collector within a predetermined focal collection zone. A means for positioning the reflector was connected to the reflector. Reflected solar energy impinged upon the solar energy collector, heating the fluid inside the interior conduit. A fluid transfer system moved the heated fluid to either an energy storage means or a thermal energy use means.

If there was a failure in the fluid transfer system, then the reflector was moved out of the focal collection zone by the positioning means. Such a failure was detected by a temperature sensor means located within the fluid path. This arrangement worked fine, so long as there was power to the positioning means, and there was no failure in the positioning means. However, in these events, the solar energy collector remained in the optimum spot within the focal collection zone. The dangerous heating of the energy transfer fluid while stagnant resulted in a catastrophic failure in the fluid transfer system.

SUMMARY OF THE INVENTION

The present invention relates to an improved moveable-collector, solar energy concentrating system that incorporates an automatic safety means. In the present invention, if there is a failure in a solar-heated fluid transfer system, a failure in the positioning means for a reflected solar energy collector, or a failure in power to the system, then the solar energy collector is automatically moved out of the optimal position within a focal collection zone. For the purposes of the present invention, the focal collection zone refers to the space above the solar energy concentrating reflector that receives a concentration of solar energy from the reflector that is above ambient radiant solar energy levels, and the collector moving out of the optimal position within this focal collection zone refers to moving to any position wherein the effect of the collector staying in that position would not cause a temperature or pressure problem for the fluid in the collector, as known to those of ordinary skill in the art.

Moveable-collector, solar energy concentrating systems comprise a number of elements. The primary element is an arcuate reflector which concentrates the solar energy striking its skyward surface. (For the purposes of the present invention, arcuate can refer to either cylindrically arcuate shapes, anticlastically arcuate shapes or parabolically arcuate shapes.) A structural support means holds the reflector. The secondary element is a collector which is dimensioned and configured to receive the concentrated reflected solar energy from the reflector and directs it to a conduit which contains an energy transfer fluid. A collector support means extends across the lower edge and upper edge of and above the reflector, being connected to and supporting the collector. The collector is located and disposed lengthwise across the lateral edges and above the reflector by the collector support means. The collector support means has a rotating means connected to the collector so as to move the collector within a predetermined focal zone for collecting reflected solar energy from the reflector. Connected to this support means is a means for positioning the collector in an optimal position within the focal collection zone throughout a defined solar cycle, typically the diurnal cycle. A fluid transport system connects the conduit to a thermal energy use means or an energy storage means and circulates the heated fluid through the conduit.

A first automatic safety means improvement includes a disengaging means for disconnecting control of the rotating means without the need for any sensors. Here, the positioning means must be powered by electricity, either directly or indirectly. This disconnecting means is disposed so as to be able to stop control of the rotating means by the positioning means when the positioning means loses electrical power. An example of such a disconnecting means is an electromagnetic clutch connected to the electrical power circuit powering the positioning means. The clutch would be connected to the rotating means. When power is lost to the positioning means, it is lost to the clutch, releasing the rotating means from any control by the positioning means.

Also, in this first automatic safety means embodiment, the collector support means has four elements. The first element is a transverse collector support member that spans across and above the length of the reflector. (The term "length" here refers to the distance of the span across the trough formed by the arcuate surface, from the upper edge of a first, paired reflector to the upper edge of a second, paired reflector, as shown in FIG. 4.) The second element is a rotating means which is connected to the positioning means and to the transverse collector support member. The third element is a rotating collector support member having a lower end and an upper end. At the lower end, the rotating collector support member is attached to the collector, and at the upper end it is attached to the rotating means such that the rotating collector support member allows the collector to move within the focal collection zone. Finally, the fourth element is a counterweight attached to the rotating collector support member or the rotating means. The counterweight extends outward from either the rotating means or the rotating collector support member at an angle and a distance with respect to the collector and the rotating means and having a sufficient weight such that if the positioning means loses electrical power, and the disengaging means stops control of the rotating means by the positioning means, then the counterweight forces the collector to rotate away from the optimal position in the focal collection zone.

As an alternative to using a counterweight alone to rotate the collector, the present invention can use the combination of a counterweight and a spring assist means. The spring assist means would be connected to the stationary transverse collector support member or a stationary portion of the rotating means, such as the outer pillow block of a bearing which supports a drive shaft member, as well as to either the rotating collector support member, the counterweight, or a rotating portion of the rotating means. A spring assist means such as a coil spring with a lever arm at either end of the coil could be located with a drive shaft member within the coil. One lever arm could be connected to the pillow block of a bearing supporting the drive shaft member, and the other lever arm would be connected to the counterweight where it connects to the drive shaft member. The spring would have enough torque, and the lever arms would be located with respect to that torque, so as to rotate the collector outside of the focal collection zone when the positioning means is disengaged or not powered. Preferably, one would substantially balance the collector and the counterweight such that the rotating means required a minimal torque to rotate the collector in the focal collection zone when not being engaged to the positioning means. With this arrangement, the force needed by the positioning means to overcome from the spring assist means would be minimized.

A second automatic safety means improvement includes the combination of a sensor means and a means for disconnecting control of the rotating means by the positioning means. A signal, or a lack of one, can come from one of three sensor means - a temperature sensor means, a pressure sensor means, or a position sensor means. (In some embodiments, a combination of such elements can be used.) If the signal, or a lack thereof, indicates conditions outside of predetermined limits, then the disengaging means releases the rotating means from being controlled by the positioning means, end the collector is automatically moved away from the optimal position in the focal collection zone by gravity. In addition, the present second automatic safety improvement includes the collector support means having the same four elements as in the first, as described above.

If a temperature sensor means is used in the second improvement of the present invention, then it is disposed in the fluid transport system. The temperature sensor means can detect and signal to the disengaging means when the temperature of the energy transfer fluid in the conduit exceeds a predetermined limit. If the temperature of the fluid should exceed the predetermined limit, then the disengaging means stops the positioning means from controlling the rotating means.

If a pressure sensor means is used in the second improvement of the present invention, then it too is disposed in the fluid transport system. The pressure sensor means can detect and signal to the disengaging means when the pressure of the energy transfer fluid in the conduit either falls below or exceeds a predetermined limit. If the pressure of the fluid should fall outside the predetermined limits, then the disengaging means stops the positioning means from controlling the rotating means.

If a position sensor means is used in the second improvement of the present invention, it is connected to or is part of the positioning means. If the collector is outside a predetermined limit of a calculated position or there is a failure in the positioning means to properly locate the collector, then the disengaging means stops the positioning means from controlling the rotating means.

PREFERRED EMBODIMENTS

Figure 2:
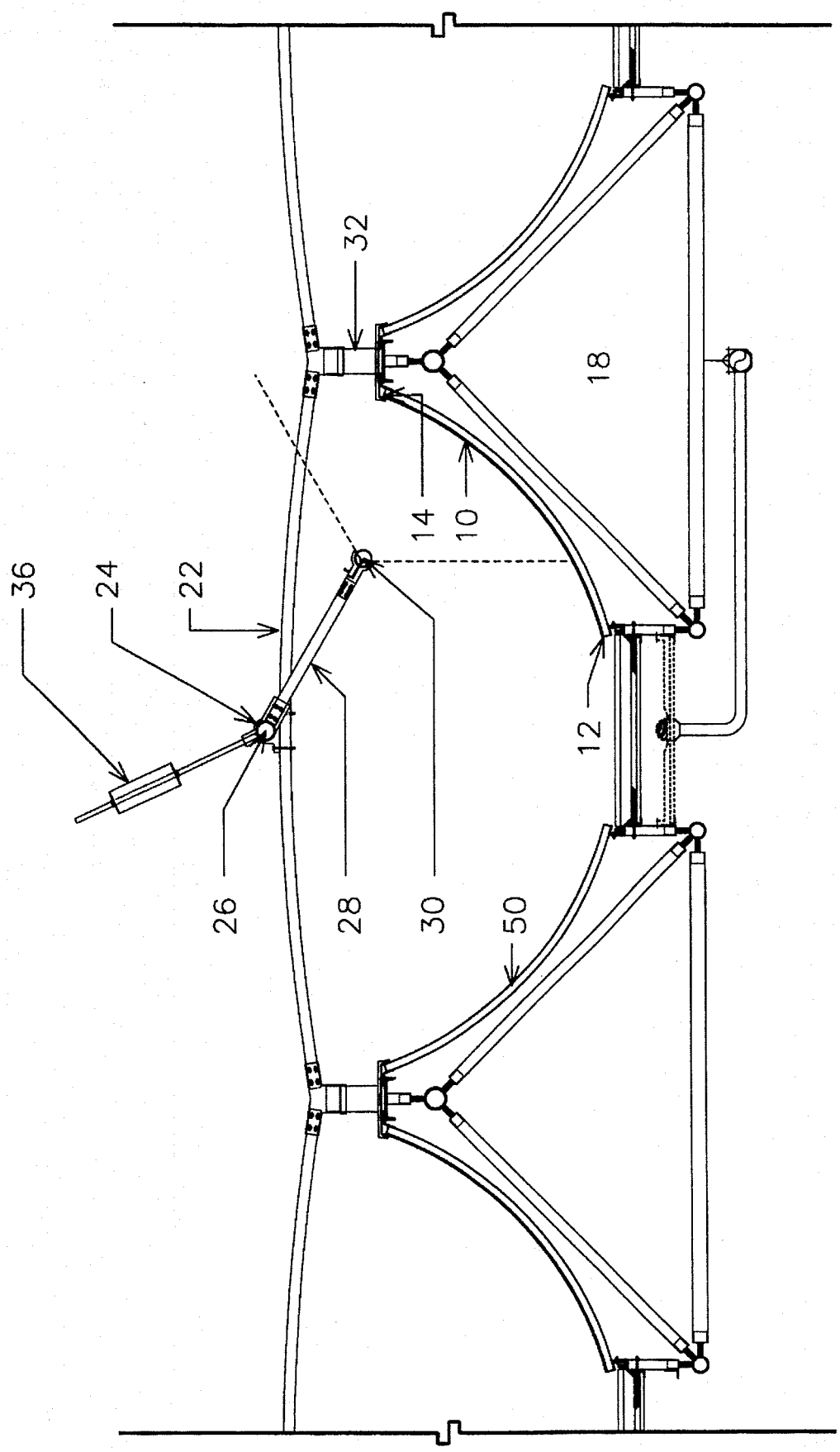
FIG. 2 is a sectional view of an embodiment of the present invention with the collector in an optimal position.
Figure 3:
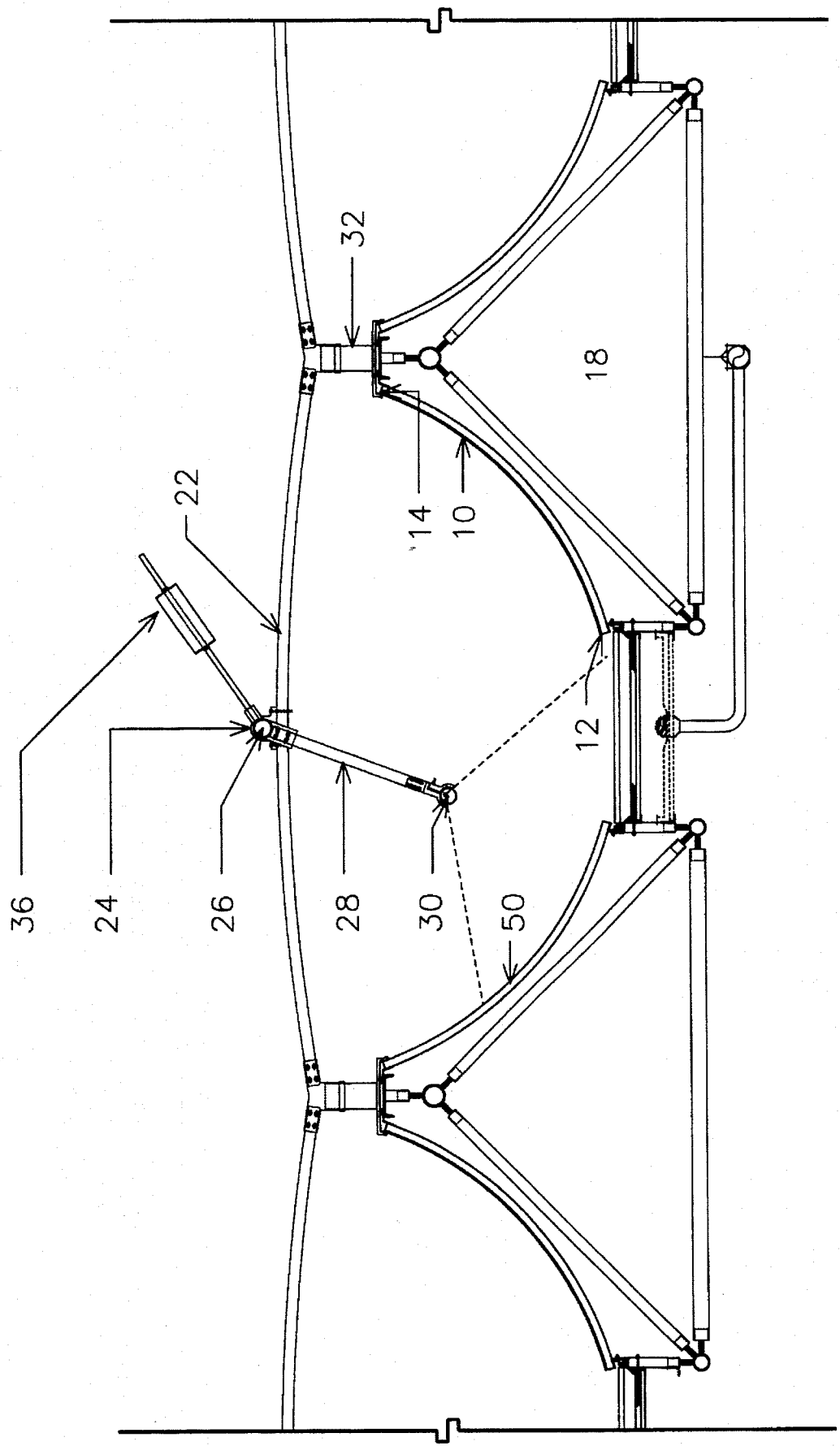
FIG. 3 is an sectional view of an embodiment of the present invention illustrating the change in position of the counterweight from FIG. 2, indicating that the positioning means no longer controls the position of the collector.
Figure 4:
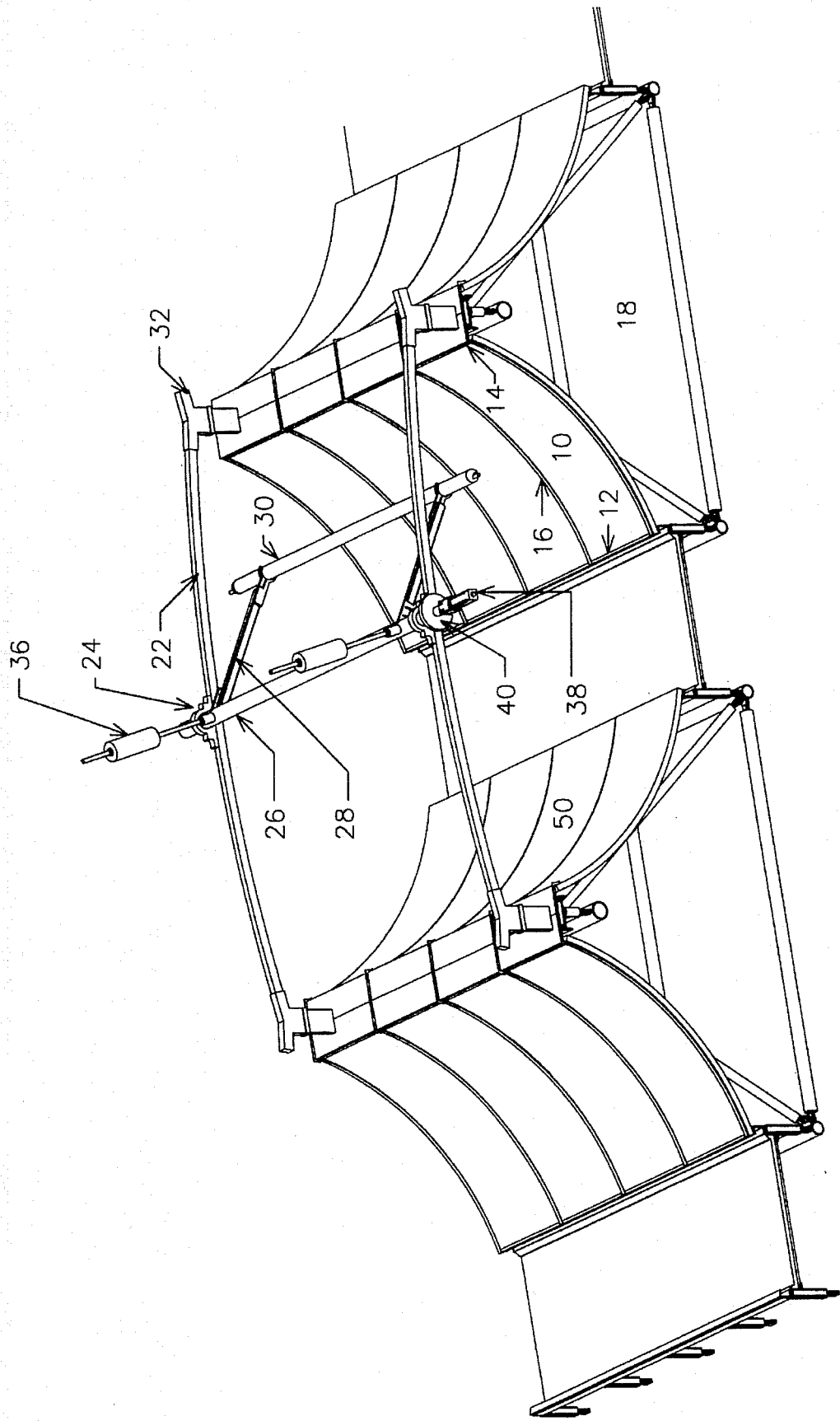
FIG. 4 is an isometric view of FIG. 2.

A preferred embodiment of the present invention is shown in the FIGURES. A series of solar energy concentrating reflectors (10) having a concave and cylindrically arcuate configuration of about 90 degrees has a lower edge (12), an upper edge (14), and curved lateral edges (16) are disposed lateral edge to lateral edge so as to form a row of reflectors. (For the purposes of the present invention, "lower" and "upper" with respect to a reflector does not express, necessarily, a relative position between the edges and a supporting surface for the reflector. For example, if a reflector has a 180 degree configuration, then these edges may be equidistant in height with respect to its supporting surface.) The skyward surface of the reflector is the concave surface. Suitable materials for the reflector include polished metals or reflectorized materials having deposited or laminated metal coatings. A structural support means (18) is disposed beneath the reflector, in this case, a simple space truss. The structural support means is dimensioned and configured to support the weight of at least the reflector, a collector, fluid within a collector conduit, and a collector support means, as well as live loads and dead loads on this combination of elements. A number of alternative configurations can be designed by those of ordinary skill in the art. A collector support means spans across the length of the reflector, as defined by the axis extending from the upper edge (14) to the lower edge (12). As shown in FIGS. 2, 3, and 4, the collector support means comprises two arches (22), a bearing means (24) on each arch (functioning as a rotating means), a drive shaft member (26) connected to the bearing means (so as to comprise a rotating means), and two downward spacing, rotating collector support members (28).

A reflected solar energy collector (30) is supported above the reflector by the collector support means—(elements 22, 24, and 26). Attachment points (32) are located adjacent to the upper edge of the reflector and connect each arch (22) to the simple space truss (18). (Alternatively, the arches could have been connected to either the reflector, or a supporting surface that underlies the structural support means.) The arches are dimensioned and configured so as to support the collector, and thus, alternative designs for the arches are known to those of ordinary skill in the art. The collector (30) extends across and above the row of reflectors. The collector is connected to the downward spacing members (28), which in turn, are connected to the drive shaft member (26), which in turn, is connected to the bearing means (24) disposed on each arch.

The collector is dimensioned and configured to receive reflected solar energy into an interior conduit through which a fluid can flow. Preferred embodiments of collectors for cylindrically arcuate reflectors are disclosed in U.S. Pat. No. 5,274,497. Suitable fluids include commercially available heat transfer fluids. A fluid transport system, not shown, connects the conduit of the collector to a conventional thermal energy use means or a conventional thermal energy storage means. The fluid transport means circulates the solar energy-heated fluid. The fluid transport means can be of conventional designs known to those of ordinary skill in the art.

In a preferred embodiment for cylindrically arcuate reflectors, the center of rotation for the rotating means is located at the center of curvature of the reflector. The downward spacing members (28) are dimensioned such that the collector is located downward from the center of curvature by a distance L plus or minus 5% according to the formula:

$$L=(R*1.1)/2$$

where R equals the radius of the curvature of the reflector. The above arrangement of elements allows the collector to move within a predetermined and defined focal zone for collecting optimum reflected solar energy from the reflector.

The present improvement also comprises a counterweight (36) attached to the rotating collector support member (28), as shown in FIGS. 2, 3, and 4. (Alternatively, the counterweight can be connected to the drive shaft member (26)). The counterweight extends outward from either the rotating collector support member or the drive shaft member at an angle and a distance with respect to the collector and the rotating means and having a sufficient weight such that if the disengaging means stops the positioning means from controlling the rotating means, then the counterweight forces the collector to rotate outside of the focal collection zone.

Figure 1:
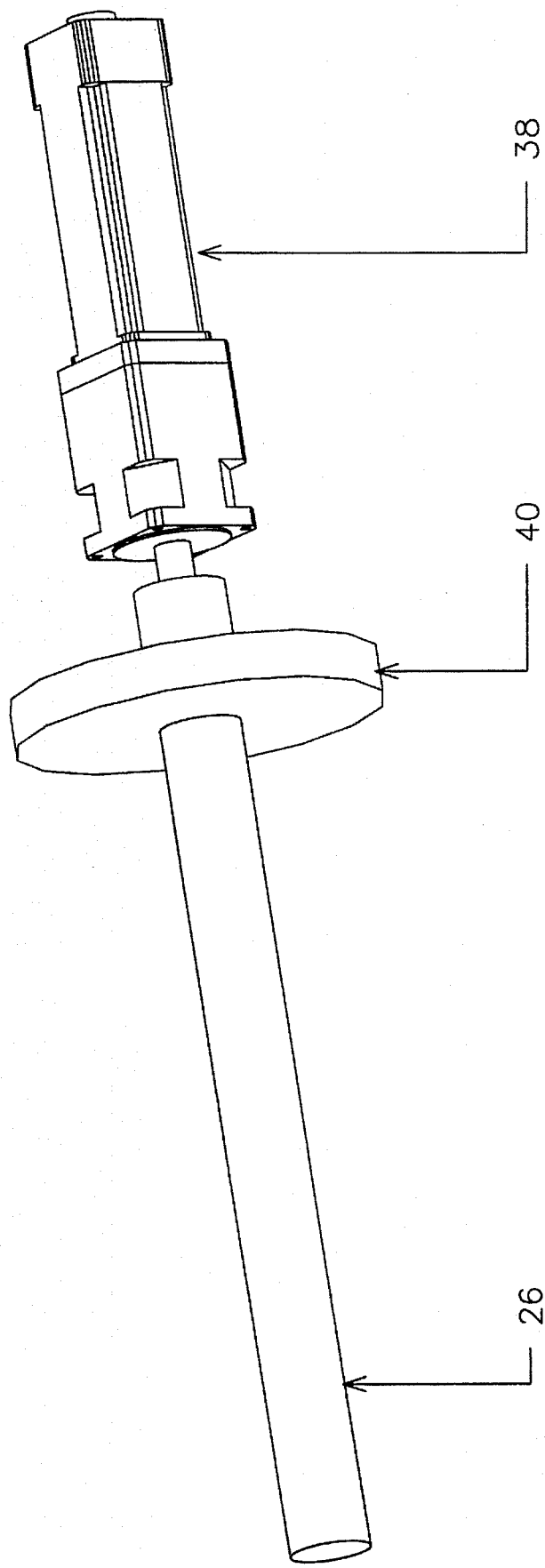
FIG. 1 is an isometric detail view of part of the positioning means and the disengaging means.

A means for positioning the collector (38) is connected to the drive shaft member (26), as shown in detail in FIG. 1. This positioning means can comprise any of a number of conventional means including a hydraulic motor driven by a hydraulic pump and control means, an electrical motor, or a mechanical chain/gear or cable/pulley means. In any of these forms, the positioning means keeps the collector in an optimal position for collecting solar energy throughout a defined solar cycle. The defined solar cycle is typically the diurnal solar cycle or it can be a more seasonally adjusted cycle. Thus, a microprocessor can be part of the positioning means, calculating periodically the optimal solar energy gathering position according to an algorithm that takes into account the latitude, the time of year, and the time of day. Such algorithms are known to those of ordinary skill in the art.

The present improvement includes a disengaging means (40) for disconnecting control of the rotating means, in this case the drive shaft member portion (26), by the positioning means (38), as shown in FIG. 1. The type of disengaging means used relates to the type of connection made between the rotating means and the positioning means. For example, if a hydraulic motor is used, then the disengaging means can be a valve means that releases pressure to the hydraulic motor. If an electrical motor is used, then the disengaging means can be a electromagnetic clutch disposed between the drive shaft member and the motor. The clutch disengages upon a signal, or a lack of a signal, being sent from a sensor means.

A signal, or a lack of one, can come from one of three conventional means—a temperature sensor means, a pressure sensor means, or a position sensor means. In some embodiments, a combination of such elements can be used. If the signal, or a lack thereof, indicates conditions outside of predetermined limits, then the means for disconnecting control releases the rotating means, and the collector is automatically forced outside of the focal collection zone by gravity.

FIG. 3 illustrates what happens to the collector (30) when the disengaging means, such as a clutch (40), releases the motor from controlling the position of the collector with respect to the reflector (10). In FIG. 2, the positioning means (38) has the collector in an optimal collecting position above the reflector (10). Upon a power loss, or upon receiving a signal, the disengaging means releases the drive shaft member (26) from being controlled by the positioning means. The force of gravity on the counterweight causes the drive shaft member to rotate to a new position where the collector is no longer focused on the reflector, but instead on a non-reflective panel (50). (The dotted lines show the focal collection zone for the collector.) In its new position, the collector no longer receives reflected solar energy.

The present improvement also serves to protect against stagnation problems if a general power failure occurs. For example, if power must be supplied to the disengaging means, such as an electromagnetic clutch as shown in the FIGURES, in order for the positioning means to control the drive shaft, then a loss of power will free the clutch, allowing gravity to act on the counterweight and swing the collector out of the focal collection zone.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. An improved solar energy concentrating system having an arcuate, solar energy concentrating reflector; a structural support means connected to the reflector which holds the reflector in a predetermined stationary position; a reflected solar energy collector being located and disposed above the reflector so as to move within a predetermined focal zone for collecting reflected solar energy from the reflector, said collector being dimensioned and configured to receive the reflected solar energy from the reflector into a conduit through which an energy transfer fluid can flow, said fluid being heated by the reflected solar energy; a collector support means extending lengthwise across and above the reflector which is connected to and supports the collector; a means for automatically positioning the collector in an optimal position within the focal collection zone throughout a defined solar cycle, said positioning means being connected to the collector support means; and a fluid transport means which connects the conduit of the collector to a thermal energy means, wherein the fluid transport means circulates the fluid through the conduit; wherein the improvement comprises:

a) a disengaging means for disconnecting control over a rotating means, said disengaging means being disposed between the rotating means and the positioning means so as to be able to stop control of the rotating means by the positioning means;

b) a temperature sensor means disposed in the fluid transport system, said temperature sensor means being able to detect and signal to the positioning means when the temperature of the fluid in the collector exceeds a predetermined limit such that if the temperature of the fluid should exceed the predetermined limit, then the disengaging means stops control over the rotating means by the positioning means; and c) the collector support means having:
   i) a transverse collector support member that spans across and above the length of the reflector;
   ii) a rotating means which is connected to the positioning means and to the transverse collector support member;
   iii) a rotating collector support member having a lower end and an upper end, which at the lower end is attached to the collector, and at the upper end is attached to the rotating means such that the rotating collector support member allows the collector to move within the focal collection zone; and iv) a counterweight attached to the rotating collector support member or the rotating means, said counterweight extending outward at an angle and a distance with respect to the collector and the rotating means and having a sufficient weight such that if the disengaging means stops control of the rotating means by the positioning means, then the counterweight forces the collector to rotate away from the optimal position in the focal collection zone.

2. The improved solar energy concentrating system of claim 1 also comprising a spring assist means connected at a first end to a first spring assist attachment point, and at a second end to a second spring assist attachment point, said spring assist means having enough torque as connected so as to rotate the collector outside of the focal collection zone when the disengaging means disconnects control over the rotating means by the positioning means.

3. The improved solar energy concentrating system of claim 2 wherein the collector and the counterweight are substantially balanced with respect to the center of rotation of the rotating means, such that the rotating means requires the least torque to rotate the collector when the rotating means is not controlled by the positioning means.

4. The improved solar energy concentrating system of claim 1 also comprising a pressure sensor means disposed in the fluid transport system, said pressure sensor means being able to detect and signal to the positioning means such that when the pressure of the solar-heated fluid in the collector either falls below a lower predetermined limit or exceeds an upper predetermined limit, then the disengaging means stops control over the rotating means by the positioning.

5. The improved solar energy concentrating system of claim 1 also comprising the positioning means having a position sensor means whereby if the collector is outside a predetermined limit of a calculated position within the focal collection zone, or there is a failure in the positioning means control over the rotating means, then the disengaging means stops control over the rotating means by the positioning means.

6. The improved solar energy concentrating system of claim 5 also comprising a pressure sensor means disposed in the fluid transport system, said pressure sensor means being able to detect and signal to the positioning means such that when the pressure of the solar-heated fluid in the collector either falls below a lower predetermined limit or exceeds an upper predetermined limit, then the disengaging means stops control over the rotating means by the positioning.

7. An improved solar energy concentrating system having an arcuate, solar energy concentrating reflector; a structural support means connected to the reflector which holds the reflector in a predetermined stationary position; a reflected solar energy collector being located and disposed above the reflector so as to move within a predetermined focal zone for collecting reflected solar energy from the reflector, said collector being dimensioned and configured to receive the reflected solar energy into a conduit through which an energy transfer fluid can flow, said fluid being heated by the reflected solar energy; a collector support means extending lengthwise across and above the reflector which is connected to and supports the collector; a means for automatically positioning the collector in an optimal position within the focal collection zone throughout a defined solar cycle, said positioning means being connected to the collector support means; and a fluid transport means which connects the conduit of the collector to a thermal energy means, wherein the fluid transport means circulates the fluid through the conduit; wherein the improvement comprises:

a) a disengaging means for disconnecting control over a rotating means said disengaging means being disposed between the rotating means and the positioning means so as to be able to stop control of the rotating means by the positioning means;

b) a pressure sensor means disposed in the fluid transport system, said pressure sensor means being able to detect and signal to the positioning means such that when the pressure of the solar-heated fluid in the collector either falls below a lower predetermined limit or exceeds an upper predetermined limit, then the disengaging means stops control over the rotating means by the positioning means; and c) the collector support means having:
  i) a transverse collector support member that spans across and above the length of the reflector;
  ii) a rotating means which is connected to the positioning means and to the transverse collector support member;
  iii) a rotating collector support member having a lower end and an upper end, which at the lower end is attached to the collector, and at the upper end is attached to rotating means such that the rotating collector support member allows the collector to move within the focal collection zone; and
  iv) a counterweight attached to the rotating collector support member or the rotating means, said counterweight extending outward at an angle and a distance with respect to the collector and the rotating means and having a sufficient weight such that if the disengaging means stops control of the rotating means by the positioning means, then the counterweight forces the collector to rotate away from the optimal position in the focal collection zone.

8. The improved solar energy concentrating system of claim 7 also comprising a spring assist means connected at a first end to a first spring assist attachment point, and at a second end to a second spring assist attachment point, said spring assist means having enough torque as connected so as to rotate the collector outside of the focal collection zone when the disengaging means disconnects control over the rotating means by the positioning means.

9. The improved solar energy concentrating system of claim 8 wherein the collector and the counterweight are substantially balanced with respect to the center of rotation of the rotating means, such that the rotating means requires the least torque to rotate the collector when the rotating means is not controlled by the positioning means.

10. The improved solar energy concentrating system of claim 7 also comprising the positioning means having a position sensor means whereby if the collector is outside a predetermined limit of a calculated position within the focal collection zone, or there is a failure in the positioning means control over the rotating means, then the disengaging means stops control over the rotating means by the positioning means.

11. An improved solar energy concentrating system having an arcuate, solar energy concentrating reflector; a structural support means connected to the reflector which holds the reflector in a predetermined stationary position; a reflected solar energy collector being located and disposed above the reflector so as to move within a predetermined focal zone for collecting reflected solar energy from the reflector, said collector being dimensioned and configured to receive the reflected solar energy into a conduit through which an energy transfer fluid can flow, said fluid being heated by the reflected solar energy; a collector support means extending lengthwise across and above the reflector which is connected to and supports the collector; a means for automatically positioning the collector in an optimal position within the focal collection zone throughout a defined solar cycle, said positioning means being connected to the collector support means; and a fluid transport means which connects the conduit of the collector to a thermal energy means, wherein the fluid transport means circulates the fluid through the conduit; wherein the improvement comprises:

a) a disengaging means for disconnecting control over a rotating means said disengaging means being disposed between the rotating means and the positioning means so as to be able to stop control of the rotating means by the positioning means;

b) the positioning means having a position sensor means whereby if the collector is outside a predetermined limit of a calculated position within the focal collection zone, or there is a failure in the positioning means control over the rotating means, then the disengaging means stops control over the rotating means by the positioning means; and c) the collector support means having:
  i) a transverse collector support member that spans across and above the length of the reflector;
  ii) a rotating means which is connected to the positioning means and to the transverse collector support member;
  iii) a rotating collector support member having a lower end and an upper end, which at the lower end is attached to the collector, and at the upper end is attached to the rotating means such that the rotating collector support member allows the collector to move within the focal collection zone; and
  iv) a counterweight attached to the rotating collector support member or the rotating means, said counterweight extending outward at an angle and a distance with respect to the collector and the rotating means and having a sufficient weight such that if the disengaging means stops control of the rotating means by the positioning means, then the counterweight forces the collector to rotate away from the optimal position in the focal collection zone.

12. The improved solar energy concentrating system of claim 11 also comprising a spring assist means connected at a first end to a first spring assist attachment point, and at a second end to a second spring assist attachment point, said spring assist means having enough torque as connected so as to rotate the collector outside of the focal collection zone when the disengaging means disconnects control over the rotating means by the positioning means.

13. The improved solar energy concentrating system of claim 12 wherein the collector and the counterweight are substantially balanced with respect to the center of rotation of the rotating means, such that the rotating means requires the least torque to rotate the collector when the rotating means is not controlled by the positioning means.

14. An improved solar energy concentrating system having an arcuate, solar energy concentrating reflector; a structural support means connected to the reflector which holds the reflector in a predetermined stationary position; a reflected solar energy collector being located and disposed above the reflector so as to move within a predetermined focal zone for collecting reflected solar energy from the reflector, said collector being dimensioned and configured to receive the reflected solar energy from the reflector into a conduit through which an energy transfer fluid can flow, said fluid being heated by the reflected solar energy; a collector support means extending lengthwise across and above the reflector which is connected to and supports the collector; a means for automatically positioning the collector in an optimal position within the focal collection zone throughout a defined solar cycle, said positioning means being connected to the collector support means and being electrically powered; and a fluid transport means which connects the conduit of the collector to a thermal energy means, wherein the fluid transport means circulates the fluid through the conduit; wherein the improvement comprises:

a) a disengaging means for disconnecting control over a rotating means said disengaging means being disposed between the rotating means and the positioning means so as to be able to stop control of the rotating means by the positioning means when the positioning means loses electrical power; and b) the collector support means having:
  i) a transverse collector support member that spans across and above the length of the reflector;
  ii) a rotating means which is connected to the positioning means and to the transverse collector support member;
  iii) a rotating collector support member having a lower end and an upper end, which at the lower end is attached to the collector, and at the upper end is attached to the rotating means such that the rotating collector support member allows the collector to move within the focal collection zone; and
  iv) a counterweight attached to the rotating collector support member or the rotating means, said counterweight extending outward at an angle and a distance with respect to the collector and the rotating means and having a sufficient weight such that if the disengaging means stops control of the rotating means by the positioning means, then the counterweight forces the collector to rotate away from the optimal position in the focal collection zone.

15. The improved solar energy concentrating system of claim 14 also comprising a spring assist means connected at a first end to a first spring assist attachment point, and at a second end to a second spring assist attachment point, said spring assist means having enough torque as connected so as to rotate the collector outside of the focal collection zone when the disengaging means disconnects control over the rotating means by the positioning means.

16. The improved solar energy concentrating system of claim 15 wherein the collector and the counterweight are substantially balanced with respect to the center of rotation of the rotating means, such that the rotating means requires the least torque to rotate the collector when the rotating means is not controlled by the positioning means.

* * * * *